Patented Nov. 1, 1932

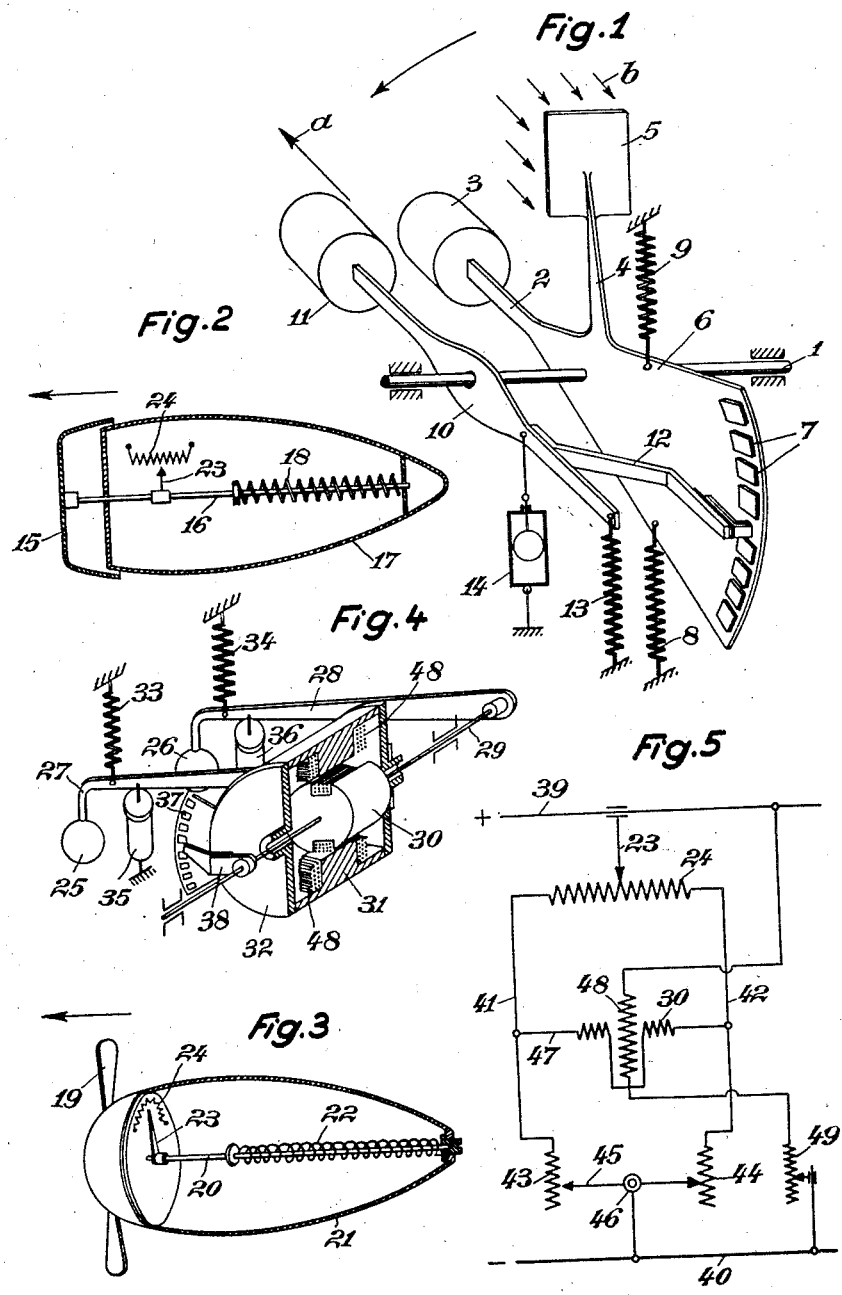

1,885,578

UNITED STATES PATENT OFFICE

JOHANN MARIA BOYKOW, OF BERLIN-LICHTERFELDE-WEST, GERMANY

APPARATUS FOR USE IN CONTROLLING AIRCRAFT

Application filed February 26, 1931, Serial No. 518,479, and in Germany March 4, 1930.

The invention relates to an apparatus for indicating the speed of aircraft or for controlling the attitude of aircraft in accordance with variations in speed. In aircraft, especially aeroplanes, the speed depends upon the attitude of the aeroplane in so far as with the nose downwardly directed the speed of the aeroplane increases and with the nose upwardly directed it diminishes. This variation in attitude is therefore used for the stabilization of speed.

If the aeroplane is controlled by hand or automatically, in accordance with an air-speed indicator, which merely indicates the speed of the aeroplane relatively to the air, a permanent over control of the aeroplane takes place on account of inertia so that the speed of the aeroplane, either with hand control or with automatic control, oscillates about a mean value.

The invention provides an apparatus which responds to variation in speed relatively to the air (and which serves either for speed indication only or for automatic speed control) and which gives an indication which "leads", or is in advance of, the velocity at any moment by an arbitrary amount. This lead is in practice to be so chosen that the control is taken up, or even a counter control imparted, before the desired speed condition is attained. By this means a damped approach to the desired speed is brought about.

The apparatus according to the invention consists of a balance responsive both to wind pressure and to mass acceleration. The indication of the balance is thus both a function of the air-speed and of the acceleration. The result of this is, for example, with an increased velocity on account of alteration of attitude or pressures on the aeroplane, that the apparatus has imposed upon it a greater speed relatively to the air than is actually the case so that the pilot with hand control or the apparatus with automatic control acts as if the correct speed had already been attained before this actually is the case, that is if the machine was dipping, stops dipping before the desired speed condition is attained. Thus it is attained that the aeroplane is damped, either directly or stepwise, in its approach to the desired speed. However, variations in the speed without variations of attitude are also possible, such variations being caused by gusts. If a gust meets the aeroplane, for example from the front, it appears from the speed indicator that there is an increase in speed equal to the wind velocity of the gust. With the usual speed indicator that would lead to an increase of the angle of incidence of the machine. If, however, a mass moment is combined with the wind pressure moment, the mass moment acts against the wind pressure moment so that in accordance with the ratio of the two moments the wind pressure moment is weakened, equalized or even turned into a moment of opposite direction. By suitably choosing both moments one can attain the result that the aeroplane travels through the gust undisturbed in position or is even caused to dip into a head-on gust. Thus by means of an apparatus according to the invention excessive straining of the structure in gusts is prevented. Further it is prevented that by increasing the angle of incidence of the aircraft its absolute speed during the gust is reduced too much, which increase, if the gust momentarily ceased, might lead under some circumstances to a dangerous speed condition which might result in stalling of the aeroplane.

In the drawing several examples of construction of an apparatus according to the invention are illustrated.

Figure 1 shows in perspective an apparatus provided with a wind vane in which the wind vane and the acceleration mass are arranged directly on the same axis of rotation, Figure 2 shows an apparatus responsive to wind pressure only with a movable extended surface or vane, Figure 3 shows a similar apparatus with rotary torsion vanes, Figure 4 shows in perspective view, partly in section, a rotary coil arrangement connected with the acceleration masses, and Figure 5 shows a circuit diagram for the apparatus according to Figures 2 to 4.

In Figure 1 the direction of flight is indicated by the arrow $a$. On the aeroplane there is arranged in the free relative wind current a horizontal shaft 1 disposed perpendicularly to the direction of flight, on which shaft a three-armed lever is fixed. On the horizontal arm 2 of the lever a mass 3 is fixed, on the vertical arm 4 an extended surface or vane 5 and on the third arm 6 a number of contacts 7. Springs 8 and 9 tend to hold the three-armed lever 2, 4, 6 in the zero position.

On the shaft 1 there is also freely pivoted a two-armed lever 10 with a mass 11 at the one end and a contact arm 12 at the other end. A spring 13 balances the weight of the mass 11, and a dashpot 14 prevents rapid oscillations of the lever 10. By conductors not shown on the drawing the contacts 7 and 12 are connected either with a speed indicator or with an automatic control device for operating the elevator for instance through a servomotor.

The apparatus described acts in the following way:

Assuming that the aeroplane is flying in the direction of the arrow $a$, the pressure of the wind due to the motion acts on the surface 5 in the direction of the arrows $b$ against the moment of gravity of the mass 3. The springs 8 and 9 maintain the balance. If a change in speed begins, for example a diminution of the velocity without the aircraft changing its attitude, for example owing to a gust from in front, the air pressure on the surface 5 increases in accordance with the wind velocity of the gust. Moreover owing to the increased wind velocity the lift on the aeroplane is increased and the aeroplane is lifted. The mass 3 tends to stay back relatively to this upward movement so that the wind pressure moment and the inertia moment act against one another. Thus the speed indication becomes influenced through the apparatus by the mass in such a way that the apparatus indicates a smaller speed than actually is the case. Thus the pilot will not pull back the control lever at all, or will not pull it back too much; or the apparatus itself when used with a controlling mechanism, does not adjust or does not over adjust, the elevator. If the two turning moments are equal, the aeroplane is driven through the gust without alteration in attitude. The lever 10 with the mass 11, under the influence of vertical accelerations, follows the lever 2, 4, 6 with delay due to the action of the dashpot 14. This is desirable in order to prevent the influence of long-continued accelerations, for example in banking during turning. This is effected by making the turning moment of the masses 3 and 11 equal, the opposing spring moments being also made equal. As a result of this, automatic adjustment of the zero position is produced under the influence of the total acceleration in turning. The apparatus thus operates correctly also during turning.

Instead of the extended surface 5 in Figure 1 the apparatus may be made according to Figure 2 in which an extended surface 15 is guided by a rod 16 in a casing 17 so as to move parallel to itself against the pressure of a spring 18.

In the apparatus according to Figure 3 the extended surface is replaced by a fan 19 which can turn about an axis 20 in a casing 21 against the action of a torsion spring 22. Both in Figure 2 and in Figure 3 a contact arm 23 slides along a regulating resistance 24, the importance of which will be explained later.

In Figure 4 masses 25 and 26 are fixed on bent levers 27 and 28. The bending of the levers has the object of allowing horizontal accelerations, as well as vertical accelerations, to act on the masses. The lever 28 is fixed on the pivotal axis 29 of a rotary armature 30 in the field of a magnet 31. The field magnet 31 is in a casing 32 with which the arm 27 of the mass 25 is connected. Springs 33 and 34 balance the weight of the masses 25 and 26. Each of the levers is connected to a dashpot 35, 36 respectively. The dashpot 36 is adjusted to be weaker than the dashpot 35 or may even be entirely omitted. A system of contacts 37 is fixed to the casing 32 and a contact arm 38 to the rotary armature 30, said arm and set of contacts co-operating in the same manner as has been explained above in connection with the contacts 7 and 12.

In Figure 5 the electric connections of the apparatus shown in Figures 2 to 4 are shown. The arrangement is in the nature of a bridge. Between the current supply conductors 39 and 40 lies the coil 24 engaged by the contact arm 23 which arm is diagrammatically shown as movable along the conductor 39. From the ends of the coil 24 conductors 41 and 42 go to regulating coils 43 and 44 between which a pivotal contact arm 45 is arranged which is connected through its bearing 46 with the conductor 40. From the conductor 41 to the conductor 42 the bridging path extends in which path the winding of the armature 30 is inserted. The field winding 48 is connected with the current supply conductors 39 and 40 by a regulating resistance 49.

The apparatus described according to Figures 2 to 4 and the circuit diagram of Figure 5 acts in the following way:

The pressure of the wind adjusts the resistance 24 by means of the surface 15 or the fan 19 so that the current strength and current direction alter automatically in accordance with the wind pressure. As a result the pressure of the wind acts through the coil 30 on the axis 29 and thus on the contact arm 38. Thus the wind pressure and the mass 26, as before, act together as in the apparatus according to Figure 1. The mass 25 is connected with the system of contacts 37 by the casing 32. It acts in the same way as the mass 11 of the apparatus according to Figure 1 for the compensation of long-continued acceleration conditions. The contact arm 45 enables the zero position of the contact arm 23 to be adjusted, thereby enabling any desired air speed to be maintained. Finally the regulating resistance 49 serves for the variation of the strength of the field of the magnet 48 in which the armature 30 is placed and thereby for the adjustment of the influence of the wind pressure on the apparatus in relation to the influence of the inertia of the masses.

I claim:—

1. Apparatus for use in controlling aircraft comprising a measuring device responsive to variations in air speed, a measuring device responsive to acceleration, a coupling between said devices such that upward acceleration of the aircraft acts in the opposite sense to the wind pressure on the device responsive to air speed and downward acceleration acts in the same sense as the wind pressure, a second device responsive to accelerations in the same sense as that first mentioned, means for damping rapid oscillations of said second device, and means associated with the two coupled measuring devices for indicating movements thereof relative to a datum associated with said second acceleration-responsive device.

2. Apparatus for use in controlling aircraft comprising a measuring device responsive to variations in air speed, a measuring device responsive to acceleration, a coupling between said devices such that upward acceleration of the aircraft acts in the opposite sense to the wind pressure on the device responsive to air speed and downward acceleration acts in the same sense as the wind pressure, a second device responsive to accelerations in the same sense as that first mentioned, means for damping rapid oscillations of said second device, and means associated with the two coupled measuring devices for controlling the supply of power to a servomotor in accordance with the movements of said coupled measuring devices relative to a datum associated with said second acceleration-responsive device.

3. Apparatus for use in controlling aircraft comprising a balance lever pivoted about a horizontal transverse axis and having an upwardly-extending arm and a forwardly-extending arm, a wind vane supported on said upwardly-extending arm, a mass supported on said forwardly-extending arm, non-gravitational means for balancing at least a part of the weight of said mass, a second forwardly-extending arm pivoted about the aforesaid axis independently of the balance-lever, a mass supported by said arm, non-gravitational means for balancing the weight of said mass, damping means for restraining rapid oscillations of said second arm while permitting it to yield under the action of long-continued accelerations, and means for indicating angular movements of said balance lever relative to a datum carried by said second arm.

4. Apparatus for use in controlling aircraft comprising a balance lever pivoted about a horizontal transverse axis and having an upwardly-extending arm and a forwardly-extending arm, a wind vane supported on said upwardly-extending arm, a mass supported on said forwardly extending arm, non-gravitational means for balancing at least a part of the weight of said mass, a second forwardly-extending arm pivoted about the aforesaid axis independently of the balance-lever, a mass supported by said arm, non-gravitational means for balancing the weight of said mass, damping means for restraining rapid oscillations of said second arm while permitting it to yield under the action of long-continued accelerations, and means for controlling the supply of power to a servomotor in accordance with the angular movements of said balance lever relative to a datum carried by said second arm.

5. Apparatus for use in controlling aircraft comprising in combination a measuring device responsive to variations in air speed, a measuring device responsive to acceleration, and an electromagnetic coupling between said devices.

6. Apparatus for use in controlling aircraft comprising in combination a measuring device responsive to variations in air speed, a measuring device responsive to acceleration, an armature situated in a magnetic field and rotatable by said device responsive to acceleration, and means operated by said device responsive to air speed for varying the current in the winding of said armature in accordance with variations in air-speed.

7. Apparatus for use in controlling aircraft comprising in combination a measuring device responsive to variations in air speed, a device responsive to acceleration, an armature having a winding situated in a magnetic field and rotatable by said device responsive to acceleration, a bridge circuit including a source of electric current the cross-connection of which includes the winding of the armature, a resistance constituting two arms of the bridge, and a slider movable along said resistance and operatively connected to the device responsive to air speed and adapted to vary the relative amounts of said resistance apportioned to the two arms of the bridge whereby the direction and strength of the current flowing in the winding of the armature is varied in accordance with variations in air speed.

8. The invention of claim 7 wherein means are provided for varying at will the relative resistances of the two remaining arms of the bridge circuit.

9. The invention of claim 7 wherein means are provided for varying at will the intensity of the magnetic field.

10. The invention of claim 6 in combination with a second device responsive to acceleration, means for damping rapid oscillations of said device and means for indicating angular movements of said armature relative to a datum provided by said second device.

11. The invention of claim 6 in combination with a second device responsive to acceleration, means for damping rapid oscillations of said device, and means for controlling the supply of power to a servomotor in accordance with the angular movements of said armature relative to a datum provided by said second device.

12. Apparatus for use in controlling aircraft comprising in combination a measuring device responsive to variations in air speed, a measuring device responsive to acceleration, an armature rotatable by said device responsive to acceleration, a field magnet within the field of which the armature is situated and which is itself rotatable about the axis of rotation of the armature, means operated by said device responsive to air speed for varying the current in the winding of said armature in accordance with variations in air speed, a mass mounted eccentrically on said field magnet and adapted to cause said magnet to oscillate in accordance with accelerations, means for damping such oscillations as are of short period while permitting movement under the influence of long-continued accelerations, non-gravitational means for balancing the weight of said mass, and means for indicating angular movements of said armature relative to a datum carried by said field magnet.

13. Apparatus for use in controlling aircraft comprising in combination a measuring device responsive to variations in air speed, a measuring device responsive to acceleration, an armature rotatable by said device responsive to acceleration, a field magnet within the field of which the armature is situated and which is itself rotatable about the axis of rotation of the armature, means operated by said device responsive to air speed for varying the current in the winding of said armature in accordance with variations in air speed, a mass mounted eccentrically on said field magnet and adapted to cause said magnet to oscillate in accordance with accelerations, means for damping such oscillations as are of short period while permitting movement under the influence of long-continued accelerations, non-gravitational means for balancing the weight of said mass, and means for controlling the supply of power to a servomotor in accordance with the angular movements of said armature relative to a datum carried by said field magnet.

14. The invention of claim 12 in combination with means for damping the oscillations of the device responsive to acceleration to an extent less than that to which the oscillations of the field magnet are damped.

15. The invention of claim 13 in combination with means for damping the oscillations of the device responsive to acceleration to an extent less than that to which the oscillations of the field magnet are damped.

16. Apparatus for use in controlling aircraft, comprising in combination a measuring device responsive to variations in air speed, a measuring device responsive to accelerations in a horizontal direction and in the vertical direction, and a coupling between said devices such that accelerations of the craft which are directed rearwardly and upwardly will act in the opposite sense to the wind pressure, and that accelerations of the craft which are directed forwardly and downwardly will act in the same sense as the wind pressure.

In testimony whereof I affix my signature.

JOHANN MARIA BÖYKOW.